United States Patent
Steever et al.

(10) Patent No.: US 11,194,168 B2
(45) Date of Patent: Dec. 7, 2021

(54) SPLITTING OPTIC

(71) Applicant: ROBERT BOSCH START-UP PLATFORM NORTH AMERICA, LLC SERIES 1, Redwood City, CA (US)

(72) Inventors: Audrey Steever, Fremont, CA (US);
Will Weber, Olivebridge, NY (US);
Nick C. Leindecker, Stanford, CA (US)

(73) Assignee: ROBERT BOSCH START-UP PLATFORM NORTH AMERICA, LLC SERIES 1, Redwood City, CA (US)

( * ) Notice: Subject to any disclaimer, the term of this patent is extended or adjusted under 35 U.S.C. 154(b) by 260 days.

(21) Appl. No.: 16/193,867

(22) Filed: Nov. 16, 2018

(65) Prior Publication Data
US 2019/0155040 A1    May 23, 2019

Related U.S. Application Data

(60) Provisional application No. 62/588,248, filed on Nov. 17, 2017, provisional application No. 62/625,260, filed on Feb. 1, 2018, provisional application No. 62/625,205, filed on Feb. 1, 2018.

(51) Int. Cl.
*G02B 27/12*       (2006.01)

(52) U.S. Cl.
CPC .................. *G02B 27/126* (2013.01)

(58) Field of Classification Search
CPC ...................................... G02B 27/126
USPC ........................................... 359/640
See application file for complete search history.

(56) References Cited

U.S. PATENT DOCUMENTS

| 5,914,811 A * | 6/1999 | Chen ............. | G02B 5/1814 359/489.06 |
| 8,048,250 B2 * | 11/2011 | Raymond ........... | G02B 17/086 156/206 |
| 2007/0047254 A1 * | 3/2007 | Schardt ............. | G02B 5/0294 362/607 |
| 2007/0115569 A1 * | 5/2007 | Tang ................. | G02B 5/0278 359/831 |
| 2011/0273906 A1 * | 11/2011 | Nichol .............. | G02B 6/0088 362/607 |

FOREIGN PATENT DOCUMENTS

WO      0120387 A1    3/2001

* cited by examiner

*Primary Examiner* — James R Greece
(74) *Attorney, Agent, or Firm* — Brooks Kushman P.C.

(57) ABSTRACT

An optical apparatus includes a substrate that is configured to redirect a predetermined percentage of an input light beam at a plurality of angles to form a set of output beams at each of the angles such that light beams redirected at each of the angles cooperate to form bands of light at a range of predetermined distances from the optical apparatus.

20 Claims, 4 Drawing Sheets

SPLITTING OPTIC

CROSS-REFERENCE TO RELATED APPLICATIONS

This application claims the benefit of U.S. provisional application Ser. No. 62/588,248 filed Nov. 17, 2017, U.S. provisional application Ser. No. 62/625,260 filed Feb. 1, 2018, and U.S. provisional application Ser. No. 62/625,205 filed Feb. 1, 2018, the disclosures of which are hereby incorporated in their entirety by reference herein.

TECHNICAL FIELD

This invention relates generally to the optics field, and more specifically to a new and useful apparatus for splitting a beam of light.

BACKGROUND

Optical systems can be used in range finding applications, navigation applications, radial metrology applications, laser-based applications, illumination, or other suitable operations.

SUMMARY

An optical apparatus includes a substrate that is configured to redirect a predetermined percentage of an input light beam at a plurality of angles to form a set of output beams at each of the angles such that light beams redirected at each of the angles cooperate to form bands of light at a range of predetermined distances from the optical apparatus.

The substrate may be further configured to pass through substantially undeviated a remaining percentage of the input light beam. The substrate may be a formed of at least one bendable element. The substrate may support a microstructure that defines a repeated pattern. The microstructure may define one or more prismatic angled facets according to the repeated subpattern. A surface area of the prismatic angled facets may be based on the predetermined percentage. At least one of the prismatic angled facets may be curved along a direction defined by a y-axis of the repeated subpattern.

An apparatus for splitting a light beam includes a substrate configured to receive an input beam from a light source and defining a repeating prismatic pattern that includes non-angled facets configured to allow undeviated continuation of a predetermined percentage of the light beam and one or more angled facets configured to generate angularly deviated beams such that the angularly deviated beams sharing a common angle combine to form a band of light at a distance within a predetermined distance range from the substrate.

The angled facets may be formed into the substrate at periodic intervals to generate the angularly deviated beams. One or more of the non-angled facets and the angled facets may be straight in a cross-section along a direction defined by the repeating prismatic pattern. One or more of the non-angled facets and the angled facets may be curved in a cross-section along a direction defined by the repeating prismatic pattern. The substrate may be formed of at least one bendable element. A depth of the angled facets may be based on a desired proportion of the input beam to be diverted to the angularly deviated beams. A surface area of the angled facets may be based on a desired proportion of the input beam to be diverted to the angularly deviated beams. The angled facets may form a v-shaped groove such that an output beam includes a first output beam with a positive angle with respect to an undeviated beam created by the non-angled facets and a second output beam with a negative angle with respect to the undeviated beam. A frequency of occurrence of the angled facets of the substrate may be based on an amount of an irradiance of the input beam allocated to the angled facets. A magnitude of the positive angle is different from a magnitude of the negative angle.

An apparatus for splitting a light beam includes a substrate including a microstructure defining a plurality of subpatterns that include a non-angled surfaces configured to pass the light beam undeviated, first angled surfaces configured to redirect the light beam at a positive angle, and second angled surfaces configured to redirect the light beam at a negative angle, wherein the microstructure forms sets of light beams that cooperate to form bands of light, corresponding to the non-angled surfaces, the first angled surfaces, and the second angled surfaces, at a range of predetermined distances from the apparatus.

The positive angle and the negative angle may have different magnitudes. At least one of the first angled surfaces, the second angled surfaces, and the non-angled surfaces may be curved.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
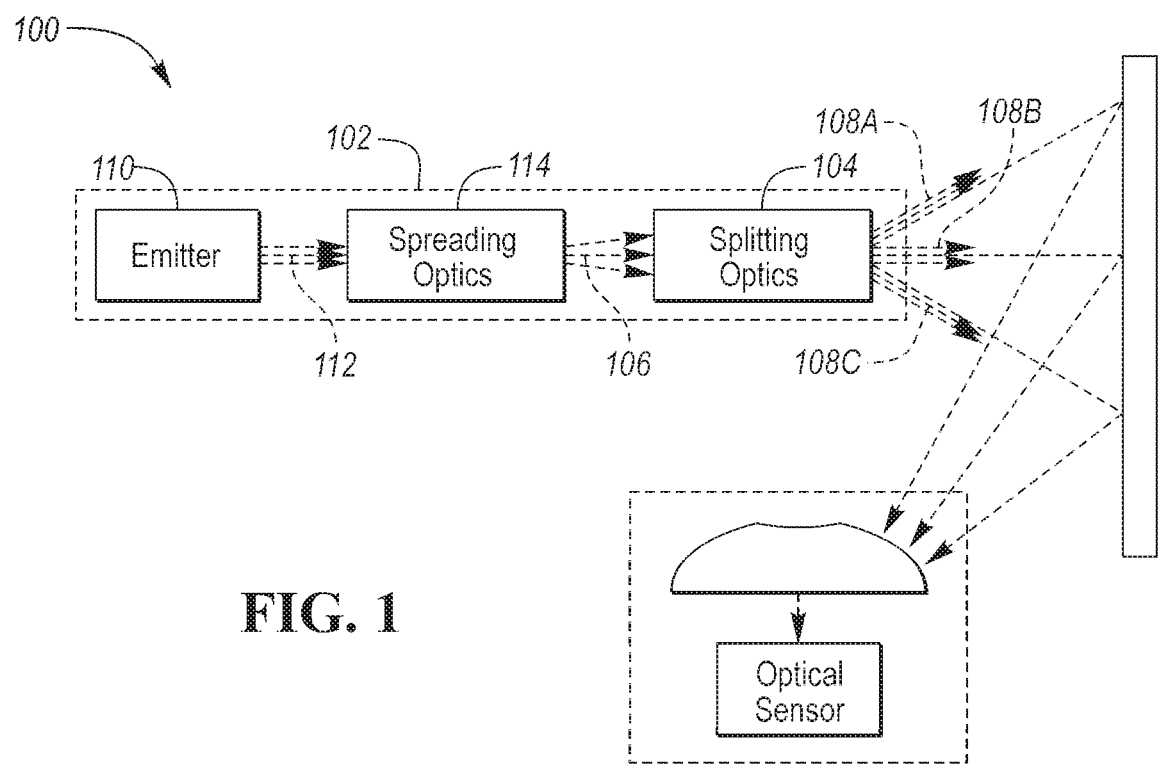
FIG. 1 is a schematic representation of an example optical system in which the splitting optic could be used.

FIG. 1 depicts an example of an imaging system 100. A splitter optic 104 functions to divide an input beam 106 into two or more beams 108, separated by one or more angles of separation (separation angles). The splitter optic 104 can optionally polarize the output beam 108, function as a waveguide, or perform any suitable functionality in addition to splitting the input beam 106. The splitter optic 104 may be used in an illumination system 102, wherein the illumination system 102 may be used in an imaging system 100

(e.g., range-finding system, example shown in FIG. 1). However, the splitter optic 104 can be used in any optical system. The illumination system 102 can include a single splitter optic, multiple splitter optics (e.g., stacked along the illumination vector, stacked perpendicular the illumination vector, etc.), or include any suitable number of splitter optics.

The input beam 106 may be derived from a single light source 110 (e.g., emitter, emitter-spreading optic pair), but can alternatively be formed from multiple light sources, a pre-splitter optic(s) local to the emitter, or any suitable set of light sources. In a specific example, the input beam 106 includes a spread beam generated by reflecting or refracting a source beam 112 off a spreading optic 114. However, the input beam 106 can be otherwise generated. The input beam 106 may be angularly convergent but can alternatively be angularly divergent. In some examples, the input beam 106 may be spread to predetermined beam widths and subsequently collimated. The input beam 106 may be unpolarized but can alternatively be polarized. The input beam 106 may be monochromatic (e.g., 850 nm), but can alternatively be multi-chromatic (e.g., white light) or have any suitable chromacity or wavelength.

Figure 2:
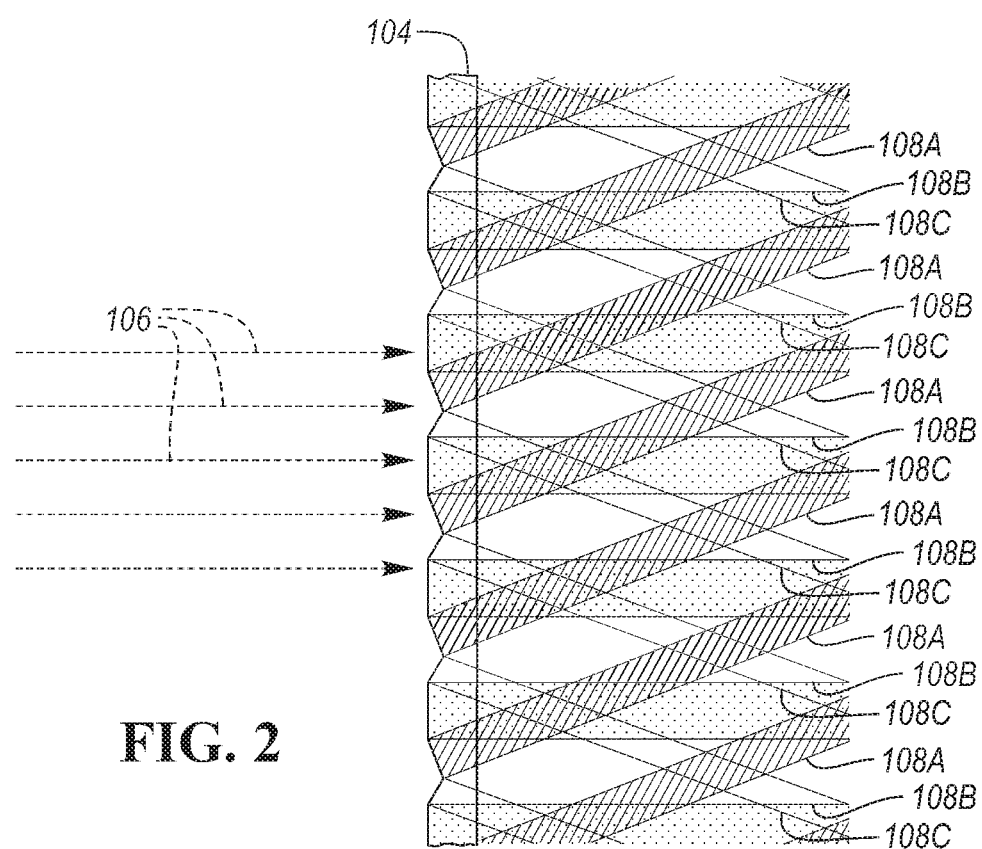
FIG. 2 is a cross-section of an example of the splitting optic in operation.

FIG. 2 depicts an example of the splitter optic 104 in operation. The output beam(s) 108 may have the same distribution and set of wavelengths as the input beam 106. The output beam(s) 108 can also have a different divergence angle, diameter, radiance, intensity, polarization, and phase from the input beam 106. In one variation, the radiance per output beam 108 may be determined based on the splitter optic's 104 surface area having the associated separation angle (e.g., the percentage of light directed into a +45° beam is the percentage of the projected area of the splitter optic 104 having an angle that is +45° from the input beam vector). Alternatively, or additionally, the radiance distribution can be determined based on the duty cycle between the angled surfaces (e.g., etchings) or otherwise determined. However, the output beam parameters can have different optical parameters from the input beam 106 or be otherwise related to the input beam parameters. The output beams 108 may be 1-dimensional beams (e.g., linear beams), but can alternatively be a 2-dimensional beam (e.g., complex pattern), or have any suitable set of dimensions. The microstructure may be linear, but can alternatively be obloid, rectangular, or have any suitable geometry. The beam cross section can be obloid, rectangular, or have any suitable geometry.

Figure 3:
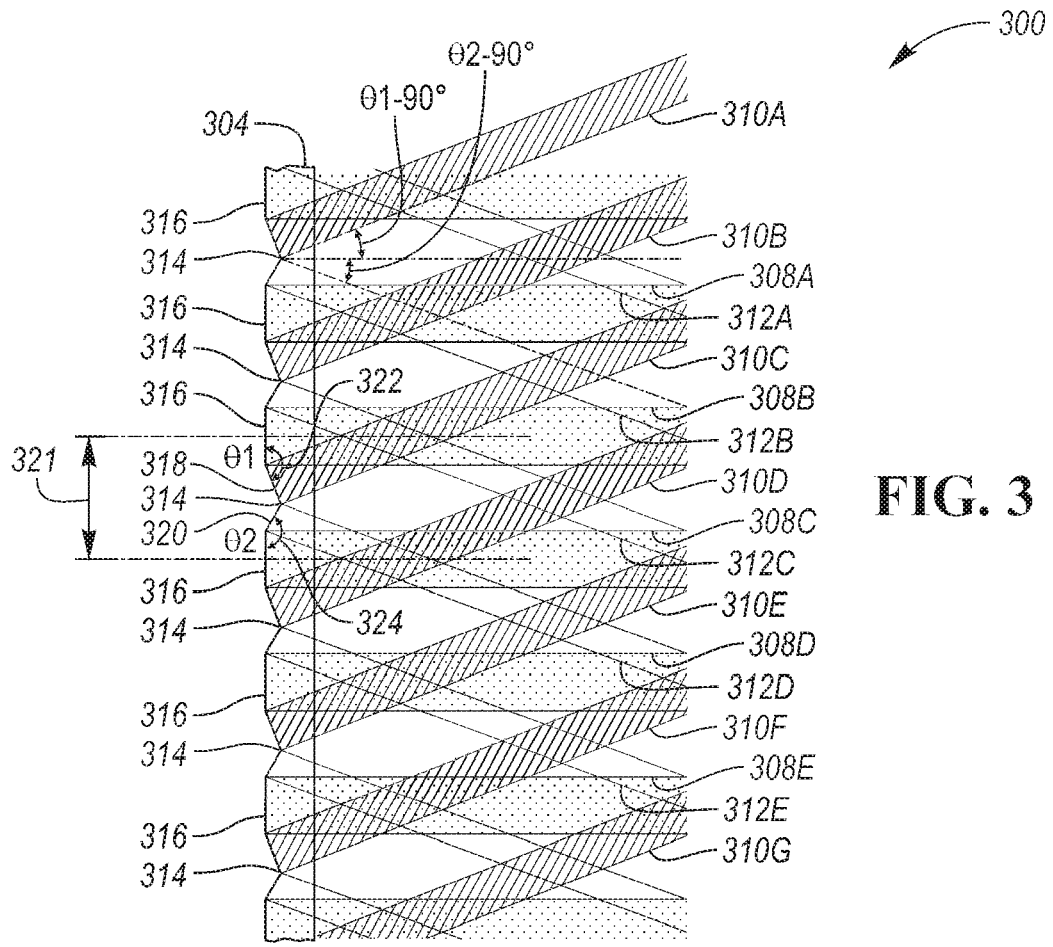
FIG. 3 is a cross-section of an example of the splitting optic configured to produce an undeviated beam, a beam at a positive angle, and a beam at a negative angle.

In a first variation 300, a splitter optic 304 redirects a portion of an input beam into a first set 308 of output beams having the same output angle (e.g., relative to the input beam vector), example shown in FIG. 3. The first set 308 of output beams may be divergent, such that the first set 308 of output beams cooperatively form a band (having the output angle) a range of predetermined distances from the splitter optic 304. A band of light may be defined as a composite of superimposed individual output beams originating from facets having the same angle and having the same deviation angle from the input beam. The splitter optic 304 may redirect different portions of the input beam into different sets (a second set 310 and a third set 312) of output beams. The output beams of each of the second set 310 and the third set 312 sharing a common output angle, wherein each of the second set 310 and the third set 312 function as that described in the first variation. In another variation, the splitter acts as a diffractive beamsplitter with a microstructure designed to allocate specific percentages of the input power to the zeroth and first diffractive orders, or additionally or alternatively to higher orders. However, the splitter optic 304 can operate in any suitable manner.

In a first example, the splitter optic 304 functions as a refractive beam splitter (e.g., array beam generator), or may function as a 1-directional refractive beam splitter (e.g., vertical beam splitter that splits an input beam into multiple output beams separated along a y-axis) but can alternatively be any other suitable beam splitter. In a second example, the splitter optic 304 can function as a prismatic or lenticular array with super-wavelength spacing. However, the splitter optic 304 can form any other suitable system.

Examples of materials that can be used to construct the splitter optic 304 include: polycarbonate, polystyrene, cured UV resin, other optical polymer, fused silica, ZnSe, Ge, Si, GaP, sapphire, glass, or any suitable material. The splitter optic 304 can optionally include coatings, such as antireflective coatings (e.g., laser line coatings), on all or a portion of the splitter optic (e.g., the substrate only, the angled surfaces only, the non-angled surfaces only, all surfaces, etc.). The splitter optic 304 may optionally be made from a combination of materials, such as a planar substrate of a first material with laminated secondary material(s) defining the splitter structure(s) on one or both sides. However, the splitter optic 304 can be made from any other suitable material.

The splitter optic 304 may include a substrate and a microstructure but can be otherwise constructed. The splitter optic 304 can optionally include a secondary, sub-wavelength grating, which can function to spectrally disperse the input beam. However, the splitter optic 304 can include any suitable set of components to provide additional functionality.

Figure 10:
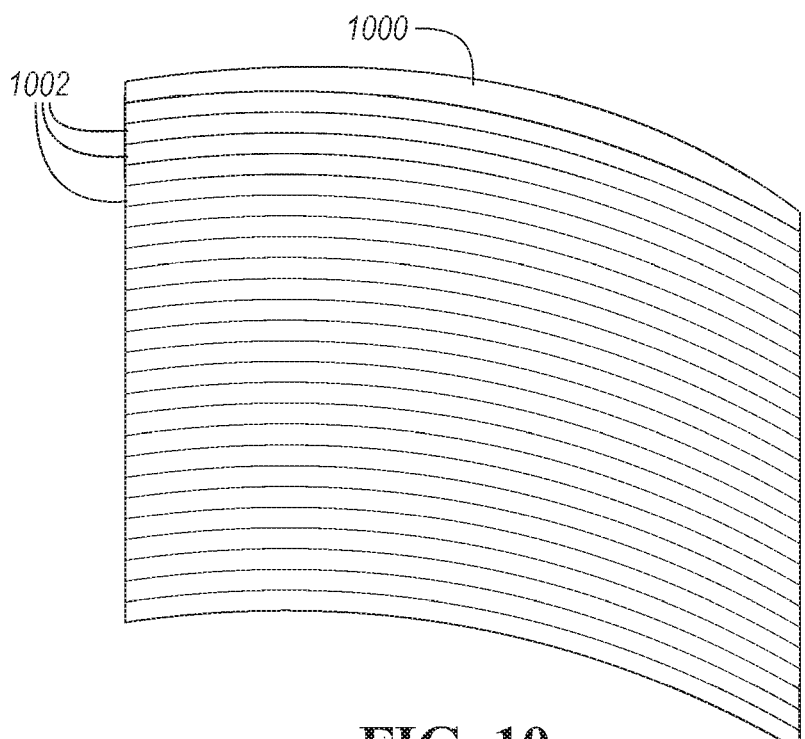
FIG. 10 is an isometric view of an example of a splitting optic having a bent configuration.

Referring to FIG. 10, the substrate 1000 may function to support or define the microstructure 1002. The substrate's optical properties may be substantially uniform throughout but can alternatively vary as a function of thickness (e.g., wherein the substrate is formed from multiple stacked layers with different optical properties), radial position (e.g., from a centerpoint), height, width, or vary in any other suitable manner. The substrate 1000, in combination with any laminated material(s), may be transparent to the input beams' wavelengths (e.g., pass through more than a predetermined percentage of perpendicular-incident light, such as 90%, 99%, etc.), but can alternatively be translucent or opaque. The substrate's refractive index may be within a predetermined range (e.g., 1%, 5%, etc.) of the refractive index of the microstructure and/or ambient media (e.g., air, at approximately 1), but can alternatively be higher or lower. In one example, the substrate's refractive index may be approximately 1.6. The substrate surface may be non-reflective but can alternatively be reflective. The substrate material 1000, in combination with any laminated material(s), may be configured to not absorb a significant proportion of the input beam (e.g., less than 10%, less than 5%, etc.), but can alternatively absorb any suitable proportion of the beam or be constructed to absorb or attenuate only certain wavelengths. The substrate material 1000, in combination with any laminated material(s), may be configured to reflect a first predetermined portion of any or all split beams, while transmitting a second predetermined portion of the remaining split beams.

The substrate 1000 can be rigid, flexible (i.e., bendable), or have any other suitable mechanical property. The substrate 1000 may have a constant thickness throughout but can alternatively have a variable thickness. The input and output faces of the substrate 1000 may be parallel, but can alternatively be faces of an overall diverging lens, converging lens, or any other suitable lens. The substrate 1000 may be curved (e.g., concave, convex), example shown in FIG. 10, but can alternatively be flat or have any suitable geometry. The substrate 1000 can be aspherical, spherical, or have any suitable curvature. The substrate 1000 may be a cylindrical segment, but can alternatively be a full cylinder, a spherical segment, a sphere, or have any suitable geometry. In one example, the substrate 1000 can be concave toward the input beam (e.g., have a convex output face). The substrate 1000 may be integral with a more complex shape, such as a portion of a housing of a vehicle that contains the imaging system.

The substrate's overall radius of curvature may be selected based on the input beam width (e.g., be equal to or a predetermined percentage of the input beam's width at the substrate's position relative to the beam-generating optic, such as a spreading optic 114), but can alternatively be selected based on the desired irradiation area upon the splitter optic 104 (e.g., vary inversely as a function of the irradiation area), or otherwise determined. The radius of curvature may be substantially (e.g., multiple orders of magnitude) larger than the depth of the microstructure 1002 (e.g., etching depth) and/or height (e.g., molding height), but can alternatively be on the same order the non-angled facets, or have any suitable dimensionality. The substrate's height may be determined based on the desired height of the resultant beams (e.g., vary as a function of the desired height), but can alternatively be determined based on the height of the input beam (e.g., be shorter than the input beam height, be larger than the input beam height, etc.), or be otherwise determined. However, the substrate 1000 can have any suitable geometry.

In a first variation, the substrate 1000 can be constructed as a unitary piece with the microstructure 1002 formed directly (e.g., etched) into the substrate 1000. In a second variation, the substrate 1000 can function as a support material, wherein the microstructure 1002 is formed by protrusions mounted to the substrate 1000. In this variation, the walls of the protrusions can form the angled surfaces of the microstructure 1002. In a third variation, the substrate 1000 can be constructed from multiple stacked layers, wherein each layer can have different optical properties (e.g., index of refraction, etc.). One or more layers within the stack can be patterned to selectively generate the angled output beams. However, the substrate layers can have any other suitable combination of optical and/or mechanical properties. However, the substrate 1000 can be otherwise constructed.

The microstructure 1002 functions to selectively refract, reflect, or diffract portions of the input beam into one or more output beams. The microstructure 1002 can be made by etching or cutting the pattern into a substrate 1000, building the structure up (e.g., fabricating the pattern) onto a substrate 1000, casting or molding the pattern with the substrate 1000, or otherwise manufactured. The splitter optic can include one or more microstructures 1002, wherein multiple microstructures 1002 can be: interlaced, stacked (e.g., in an array), or otherwise arranged. Microstructures may be formed on both sides of the substrate 1000 to act serially on the input beam. The microstructure may be diffractive or prismatic faceted.

The microstructure 1002 may include multiple instances of a cyclically repeated subpattern 321, example shown in FIG. 3, but can alternatively include one or more instances of multiple subpatterns (e.g., when more than two angled beams are desired or overlapping bands with different irradiance at an illuminated target are desired). For example, a subpattern 321 can be on the order of 0.1 mm-0.5 mm high (e.g., 2 to 10 repetitions per mm), but can have any suitable dimensionality or frequency (e.g., height less than 0.1 mm or greater than 1.0 mm). The subpattern 321 may be a predetermined number of times smaller than the overall splitter optics dimensions (e.g., less than 1/10 the height of the splitter optic) but can have any suitable relative dimensionality. Different subpatterns can have angled surfaces arranged at different angles, angled surfaces separated by different etching transition lengths, angled surfaces with different curvatures, or differ in any other suitable manner. In one variation, the subpattern 321 is repeated along the y-axis (e.g., along the splitter optic height). However, the subpattern 321 can be repeated along the x-axis of the splitter optic 304 or along any suitable direction. The microstructure subpattern may have practical dimensions of approximately millimeter scale or less.

The subpattern 321 functions to generate one or more sets 310, 312 of angled beams, wherein one or more beams sharing the same angle (e.g., 310A, 310B, 310C, 310D, 310E, 310F, 310G) can cooperatively form a light band. The subpattern 321 may have super-wavelength dimensions and may refract or reflect the input beam into the output beams of the sets 310, 312 (e.g., wherein the angle of the angled surfaces and material index of refraction, having a value of −1 for reflection, dictate the output beam angle per Snell's Law). However, the subpattern 321 can alternatively diffract the input beam due to physical properties of the microstructure and optical wavelength (e.g. diffraction grating, Holographic Optical Element (HOE), or Holographic Diffuser), partially reflect the beam off the boundaries of stacked microstructures of different refractive indices (i.e., Fresnel reflection), or otherwise split the input beam. The subpattern height (d) can be determined based on scale of the system, illumination uniformity desired at target objects, manufacturing convenience, and stray-light issues, or be otherwise determined. The subpattern 321 can include one or more non-angled facets 316 alternating with one or more angled surfaces 318, 320 or can be otherwise constructed.

Figure 5:
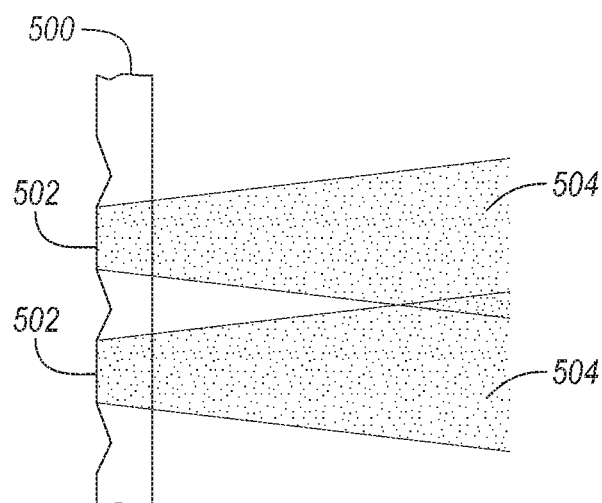
FIGS. 5-7 are cross-sections of examples of the splitting optic producing output beams from a plurality of individual facets.

A non-angled facet 502 of the subpattern may function to allow unredirected continuation of the input beam through the substrate 500 (i.e., form an output beam at 0° to the input beam), example shown in FIG. 5. The non-angled facet 502 can also function to as a pattern transition, and separate adjacent subpatterns. The non-angled facet 502 can be formed by the space between adjacent subpatterns formed (e.g., cut or etched) into the substrate 500, be the flat top of a protrusion mounted to the substrate 500, or otherwise formed. The non-angled facet 502, in a y-axis cross-section, can be curved, straight, or have any suitable configuration. In cases where the non-angled facet 502 is not straight in the y-axis cross section, the surface can be concave, convex, freeform, or take any other suitable shape. In some configurations, the non-angled facet 502 has a curvature designed to diverge or converge (or to collimate or modify divergence/convergence if the input beam is divergent or convergent) the fraction of the output beam 504, allowing the elevational angular distribution of the light to be further controlled.

The relative height (i.e., duty cycle) of the non-angled facet 502 may be determined based on the desired proportion of the undeviated beam 504. In one variation, the height of the non-angled facet 502 varies as a function of the desired undeviated beam irradiance. The desired undeviated beam irradiance can be manually determined, automatically determined based on objects detected in the undeviated beam's path, or otherwise determined. In a second variation, the proportion of the microstructure's height that is occupied by the non-angled facet 502 (e.g., in aggregate) can be determined based on the proportion of the input beam's irradiance on the splitter optic allocated to the undeviated beam 504. In some variations, the proportion of the subpattern's surface area occupied by the non-angled facet 502 (e.g., individually, in aggregate) can be determined based on the proportion of the input beam's irradiance on the splitter optic allocated to the undeviated beam 504. However, the non-angled facet's relative or absolute dimensions can be otherwise determined.

Figure 6:
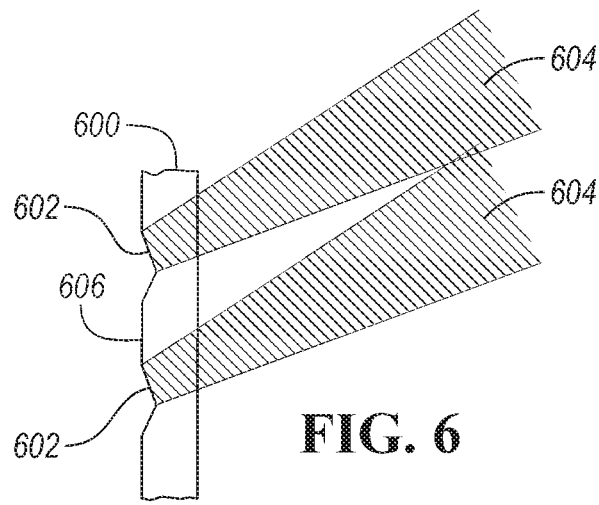
Figure 7:
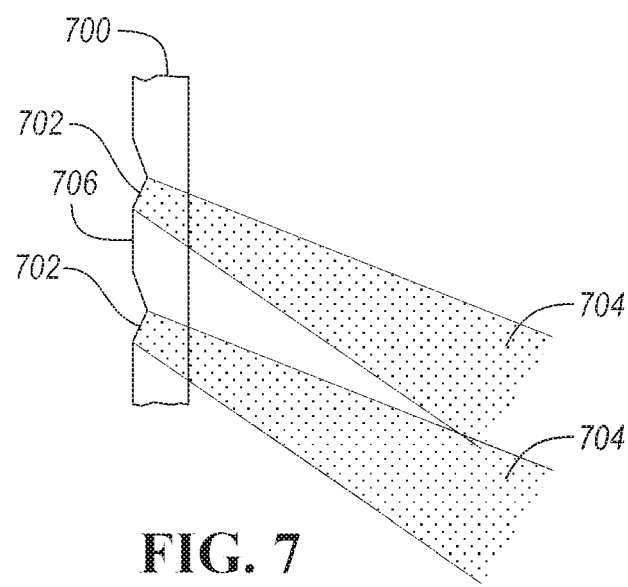

An angled surface or facet of the subpattern functions to redirect the input beam at a predetermined angle, which forms an angled output beam, examples shown in FIG. 6 and FIG. 7. Angled surfaces 602, 702 can optionally diffuse the input beam, which may form or increase diverging output beams 604, 704. The angled surface 602, 702 may be recessed relative to non-angled facets 606, 706 (e.g., into the substrate), but can alternatively be proud of the non-angled facets 606, 706 or otherwise arranged.

The angled surfaces 602, 702 may be cast onto the substrates 600, 700 in a direct-cure process, but can alternatively be formed into (e.g., cut or etched) the substrates 600, 700 or otherwise constructed. The angled surfaces 602, 702 may be defined relative to the non-angled facets 606, 706, wherein an internal angle extends from the non-angled facets 606, 706 to the angled surfaces 602, 702 through the substrate interior, but can alternatively be defined relative to the output face of the substrate, relative to the input beam vector, or defined relative to any other suitable reference point. At least one of the angled surfaces or non-angled facets may have diffusing or absorbing properties.

The internal angle between the non-angled facets 606, 706 and the angled surfaces 602, 702 can be determined (e.g., calculated by Snell's Law, selected, etc.) based on the desired angle of the angled output beams 604, 704 (e.g., relative to the input beam; deviation angle), based on the refractive index of the substrate and any overlay material(s), or otherwise determined. The internal angle may be measured from the flat surface contiguous with or proximal the angled surface, but can alternatively be measured from the input beam, or be otherwise measured. A desired angle can be manually determined, specified by the application (e.g., in a lookup table), or otherwise determined. In one variation, the internal angle can be defined as the desired angle plus 90°; or be defined as 180°, less the angled output beam's desired angle (example angles θ1, θ2, θ3, θ4 shown in FIG. 4). In a second variation, the internal angle can be the desired angle. In a third variation, the internal angle can be the desired angle, corrected by the substrate's refraction angle (e.g., adjusted upward or downward by the refraction angle). However, the internal angle can be otherwise determined. For example, the deviation angles may account for the substrate not being of uniform thickness.

Figure 8:
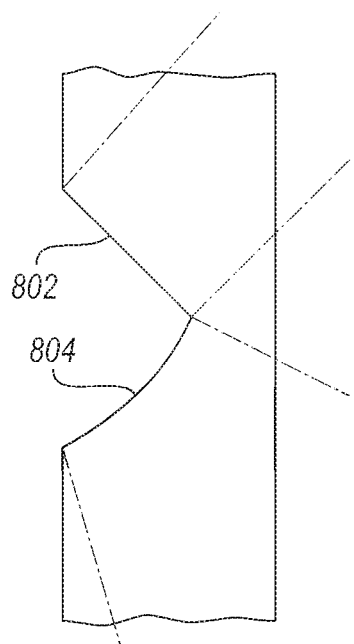
FIGS. 8 and 9 are examples of differently formed cross-sections.
Figure 9:
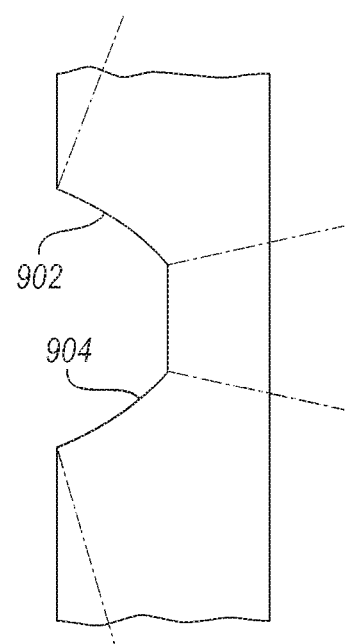

Angled surfaces 802, 804, 902, 904 may be straight in y-axis cross section, but can alternatively be convex, concave, or otherwise configured (examples shown in FIG. 8 and FIG. 9). A curvature of the angled surfaces 802, 804, 902, 904 may be aspherical but can alternatively be spherical. Such a curvature can be determined (e.g., calculated, selected) based on the wavelength of the input beam, based on the desired thickness of an individual beam at a specific target distance, based on the desired divergence or convergence, based on the convergence or divergence of the input beam, based on the desired proportion of light diverted toward the angled output beam, or otherwise determined.

The angled surfaces 802, 804, 902, 904 may include a depth. The depth can be defined along the input beam axis; perpendicular to the non-angled surface; or otherwise defined. In a first variation, the depth of the angled surfaces 802, 804, 902, 904 may be super-wavelength (e.g., multiples of the input beam's wavelength), but can alternatively be sub-wavelength, or have any other suitable relationship to the input beam's wavelength. In a second variation, the depth of the angled surfaces 802, 804, 902, 904 can be on the order of the input beam's wavelength, adjusted for the substrate's index of refraction. In some variations (e.g., super-wavelength scale), the depth of the angled surfaces 802, 804, 902, 904 can be determined based on the desired proportion of light diverted toward the angled output beam, wherein the surface area of the angled surfaces 802, 804, 902, 904 can be determined based on the desired proportion of light diverted toward the angled beam, and the surface area of the angled surfaces 802, 804, 902, 904 dictates the depth of the angled surface. In this variation, the angled surfaces 802, 804, 902, 904 can be separated from an adjacent angled surface by a straight facet in a y-axis cross section, a masked surface, or by any other suitable surface. However, the angled surfaces 802, 804, 902, 904 can have any suitable geometry. In some variations (e.g., wavelength or sub-wavelength scale), the proportion of light diverted toward the angled beam may be determined based on the diffraction parameters.

Each subpattern may include the same number of angled surfaces 802, 804, 902, 904 as the number of desired angled output beams (e.g., 2 angled surfaces when 2 angled output beams are desired) but can include any suitable number of output beams. The angled surfaces 802, 804, 902, 904 can be arranged: individually (e.g., wherein the input face of the splitter optic can include serrations), in opposing pairs (e.g., when the output beam set includes a first and second angled output beam directed in opposing directions; wherein the input face of the splitter optic can include v-grooves or proud v-ridges), or in any suitable configuration. Different angled surfaces 802, 804, 902, 904 can have different dimensions, coatings, or other optical parameters. To avoid troublesome steps in the depth dimension (i.e., z-axis), the relative area between the angled facets may be dependent on the selected deviation angles, or vice versa the deviation angles may be dependent on the desired relative areas of multiple angled facets. In any variation with a single angled facet, the depth steps may be necessary unless the entire substrate is tilted. The steps between non-contiguous facets may produce unwanted stray light, cause light loss, and may make manufacture difficult.

In a first variation 300, the splitter optic 304 is configured to split an input beam into a set 308 of undeviated beams, a second set 310 of beams with a positive angle of deviation from the input beam, and a third set 312 of beams with a negative angle of deviation from the input beam (example shown in FIG. 3). In this variation, the microstructure includes a plurality of identical, repeating subpatterns 321, wherein each subpattern 321 includes: a non-angled surface 316 and a v-groove 314. The v-groove 314 can include a first 318 and a second 320 adjacent and contiguous angled surface, wherein the first angled surface 318 is oriented with an internal angle 322 (defined from the non-angled surface) equal to 90° plus the positive angle of separation, and the second angled surface 320 is oriented with an interior angle 324 (e.g., from the plane of the non-angled section 316) equal to 90° plus the magnitude of the negative angle of separation.

Figure 4:
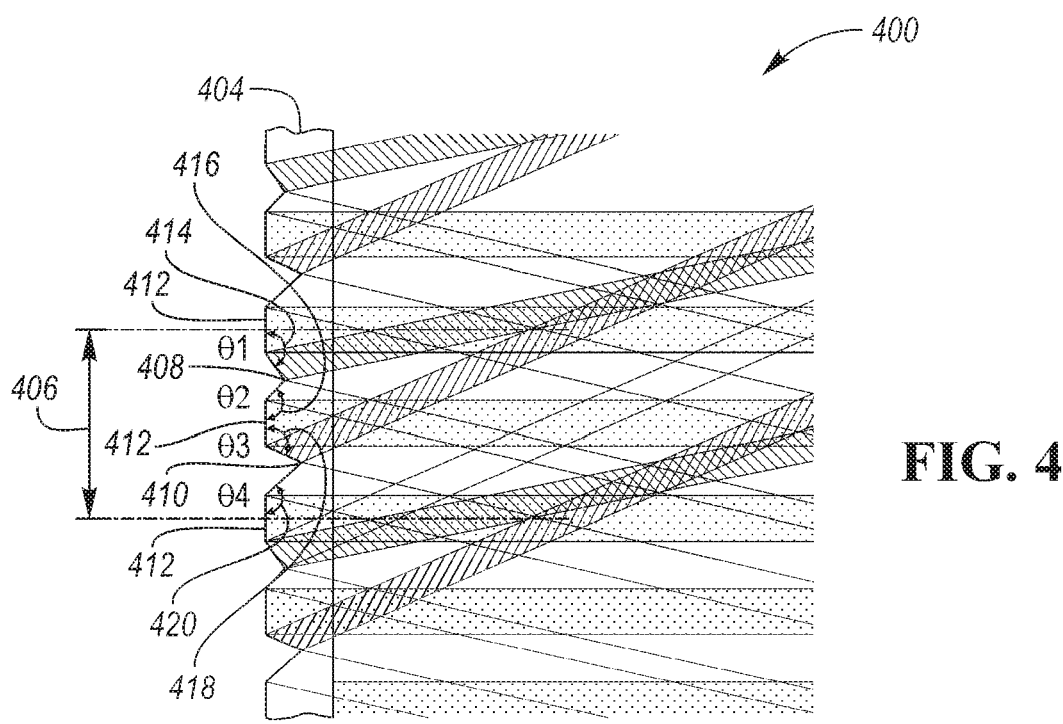
FIG. 4 is a cross-section of an example of the splitting optic configured to produce an undeviated beam, two beams at two positive angles, and two beams at two negative angles.

In a second variation 400, the splitter optic 404 is configured to redirect the input beam into three or more angled output beams, wherein the repeating subpattern 406 can include a set of non-angled surfaces 412 separating two or more v-grooves 408, 410 (example shown in FIG. 4). Each v-groove 408, 410 of the subpattern 406 can include a different set of angled surfaces (e.g., with different internal angles). In this variation, the occurrence frequency of a given angled surface appearing within the subpattern 406 may be determined based on the desired proportion of the input beam's intensity allocated to the resultant beam (and/or associated sheet) but can be otherwise determined. In one example, the splitter optic 404 can be configured with four angled facets with interior angles of: θ1, θ2, θ3, and θ4, wherein a subpattern 406 can include a first v-groove 408 having interior angles 414, 416; a second v-groove 410 having interior angles 418, 420; and a non-angled surface 412 separating the first 408 and second v-grooves 410. However, the splitter optic 404 can be otherwise configured.

The following applications are related to the present application: U.S. patent application Ser. No. 16/193,138, U.S. patent application Ser. No. 16/192,877, and U.S. patent application Ser. No. 16/193,872, all filed on Nov. 16, 2018, and U.S. patent application Ser. No. 16/193,138 issued on Sep. 7, 2021 as U.S. Pat. No. 11,112,617. Each of the identified applications is incorporated by reference herein in its entirety.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical apparatus comprising:
a substrate that is configured to redirect a predetermined percentage of an input light beam at a plurality of angles to form a set of output beams at each of the angles such that light beams redirected at each of the angles cooperate to form bands of light at a range of predetermined distances from the optical apparatus, the substrate defining a repeated subpattern including a non-angled facet, first and second angled facets forming a first groove, and third and fourth angled facets forming a second groove, the non-angled facet separates the first and second grooves such that the first and second grooves are spaced apart from each other along an entire length of the first and second grooves.

2. The optical apparatus of claim 1 wherein the substrate is further configured to pass through substantially undeviated a remaining percentage of the input light beam.

3. The optical apparatus of claim 1 wherein the substrate is formed of at least one bendable element.

4. The optical apparatus of claim 1 wherein a surface area of the first and second angled facets is based on the predetermined percentage.

5. The optical apparatus of claim 1 wherein at least one of the first, second, third and fourth angled facets is curved along a direction defined by a y-axis of the repeated subpattern.

6. An apparatus for splitting a light beam comprising:
a substrate configured to receive an input beam from a light source and defining a repeating prismatic pattern that includes a non-angled facet, first and second angled facets forming a first groove, and third and fourth angled facets forming a second groove, the non-angled facet separates the first and second grooves such that the first and second grooves are spaced apart from each other along an entire length of the first and second grooves, the non-angled facet configured to allow undeviated continuation of a predetermined percentage of the light beam and the first, second, third and fourth angled facets configured to generate angularly deviated beams such that the angularly deviated beams sharing a common deviation angle combine to form a band of light at a distance within a predetermined distance range from the substrate.

7. The apparatus of claim 6 wherein the first and second grooves are formed into the substrate at periodic intervals to generate the angularly deviated beams.

8. The apparatus of claim 6 wherein one or more of the first, second, third or fourth angled facets are straight in a cross-section along a direction defined by the repeating prismatic pattern.

9. The apparatus of claim 6 wherein one or more and the first, second, third or fourth angled facets are curved in a cross-section along a direction defined by the repeating prismatic pattern.

10. The apparatus of claim 6 wherein the substrate is formed of at least one bendable element.

11. The apparatus of claim 6 wherein a depth of the first, second, third and fourth angled facets is based on a desired proportion of the input beam to be diverted to the angularly deviated beams.

12. The apparatus of claim 6 wherein a surface area of the first, second, third and fourth angled facets is based on a desired proportion of the input beam to be diverted to the angularly deviated beams.

13. The apparatus of claim 6 wherein the first groove is a first v-shaped groove such that an output beam includes a first output beam with a positive angle with respect to an undeviated beam created by the non-angled facet and a second output beam with a negative angle with respect to the undeviated beam.

14. The apparatus of claim 6 wherein a frequency of occurrence of the first, second, third, and fourth angled facets of the substrate are based on an amount of an irradiance of the input beam allocated to the first, second, third, and fourth angled facets.

15. The apparatus of claim 6 wherein a magnitude of the positive angle is different from a magnitude of the negative angle.

16. An apparatus for splitting a light beam comprising:
a substrate including a microstructure defining a plurality of subpatterns that include a non-angled surfaces configured to pass the light beam undeviated, first and second angled surfaces configured to redirect the light beam at a positive angle and forming a first v-shaped groove, and third and fourth angled surfaces configured to redirect the light beam at a negative angle and forming a second v-shaped groove, wherein the non-angled surface separate the first and second v-shaped grooves such that the first and second v-shaped grooves are spaced apart from each other along an entire length of the first and second v-shaped grooves, and wherein the microstructure forms sets of light beams that cooperate to form bands of light, corresponding to the non-angled surfaces, the first angled surfaces, and the second angled surfaces, at a range of predetermined distances from the apparatus.

17. The apparatus of claim 16 wherein the positive angle and the negative angle have different magnitudes.

18. The apparatus of claim 16 wherein at least one of the first, second, third, and fourth angled surfaces are curved.

19. The apparatus of claim 16, wherein the first, second, third, and fourth angled surfaces have first, second, third, and fourth internal angles, respectively, wherein at least two of the first, second, third, and fourth internal angles are different.

20. The apparatus of claim 16, wherein the first v-shaped groove includes a different set of angled surfaces than the second v-shaped groove.

\* \* \* \* \*